(12) United States Patent
Broberg et al.

(10) Patent No.: US 11,570,518 B2
(45) Date of Patent: Jan. 31, 2023

(54) SYSTEMS AND METHODS FOR CREATING A SHARED PLAYBACK SESSION

(71) Applicant: Spotify AB, Stockholm (SE)

(72) Inventors: Erik Broberg, Stockholm (SE); Daniel Per Åke Lindstrand, Gothenburg (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/333,733

(22) Filed: May 28, 2021

(65) Prior Publication Data

US 2021/0409830 A1    Dec. 30, 2021

Related U.S. Application Data

(60) Provisional application No. 63/046,535, filed on Jun. 30, 2020.

(51) Int. Cl.
*H04N 21/472* (2011.01)
*H04L 65/401* (2022.01)
*H04N 21/4788* (2011.01)

(52) U.S. Cl.
CPC ... *H04N 21/47217* (2013.01); *H04L 65/4015* (2013.01); *H04N 21/4788* (2013.01)

(58) Field of Classification Search
CPC ......... H04N 21/47217; H04N 21/4788; H04N 21/4307; H04L 65/4015
USPC ........................................................ 725/88
See application file for complete search history.

(56) References Cited

U.S. PATENT DOCUMENTS

| | | | |
|---|---|---|---|
| 9,179,199 B2 | 11/2015 | Alsina et al. | |
| 9,462,344 B1* | 10/2016 | Sheedy | H04N 21/47202 |
| 10,313,761 B2 | 6/2019 | Alsina et al. | |
| 10,389,782 B2 | 8/2019 | Alsina et al. | |
| 2002/0112244 A1 | 8/2002 | Liou et al. | |
| 2008/0162668 A1 | 7/2008 | Miller | |
| 2013/0103814 A1 | 4/2013 | Carrasco et al. | |

(Continued)

OTHER PUBLICATIONS

Mendiratta, How to Stream Music to Multiple Devices Simultaneously on iPhone and Android, TechUntold, Jun. 24, 2020, downloaded from https://www.techuntold.com/stream-music-multiple-devices-simultaneously/, 8 pgs.

(Continued)

*Primary Examiner* — Nnenna N Ekpo
(74) *Attorney, Agent, or Firm* — Morgan, Lewis & Bockius LLP

(57) ABSTRACT

A first client device is associated with a first user hosting a shared playback session. While a first media content item from the shared playback session is being presented on a set of presentation devices, the first client device communicates with a set of observer devices for the shared playback session. The first client device receives a request to modify playback of the shared playback session from a second client device, the second client device being one observer device of the set of observer devices. In response to the request to modify playback of the shared playback session, the first client device determines an action to take with respect to the shared playback session. In response to determining the action to take with respect to the shared playback session, the first client device sends a command for the action to each of the set of presentation devices.

20 Claims, 7 Drawing Sheets

(56) References Cited

U.S. PATENT DOCUMENTS

| | | | |
|---|---|---|---|
| 2014/0031961 A1* | 1/2014 | Wansley | G06F 16/639 |
| | | | 700/94 |
| 2015/0249857 A1* | 9/2015 | Dion | H04N 21/4755 |
| | | | 725/109 |
| 2016/0066038 A1 | 3/2016 | Chesluk et al. | |
| 2016/0380780 A1 | 12/2016 | Stephenson et al. | |
| 2017/0103075 A1* | 4/2017 | Toumpelis | H04W 4/80 |
| 2017/0289202 A1* | 10/2017 | Krasadakis | H04L 67/06 |
| 2018/0293959 A1* | 10/2018 | Monga | H04N 21/43076 |
| 2019/0121823 A1* | 4/2019 | Miyazaki | H04N 21/4725 |
| 2019/0182562 A1 | 6/2019 | Peng et al. | |
| 2019/0243534 A1* | 8/2019 | Vega | G11B 19/025 |
| 2019/0325035 A1* | 10/2019 | Sagui | G06F 16/4387 |
| 2020/0065051 A1 | 2/2020 | Tran et al. | |

OTHER PUBLICATIONS

Spotify AB, Extended European Search Report, EP21176429.5, dated Nov. 4, 2021, 7 pgs.

\* cited by examiner

600

602 — At a first client device associated with a first user hosting a shared playback session, the first device being a master device for the shared playback session:

604 — While a first media content item from the shared playback session is being presented on a set of presentation devices, each of the set of presentation devices corresponding to a respective user of a plurality of users in the shared playback session:

606 — Communicate with a set of observer devices for the shared playback session, each observer device also corresponding to a respective user of the plurality of users in the shared playback session.
A respective device of the set of presentation devices, corresponding to a respective user of the plurality of users, is different from an observer device of the set of observer devices corresponding to the same respective user;

608 — Receive a request to modify playback of the shared playback session from a second client device, the second client device being one observer device of the set of observer devices

610 — The request to modify playback of the shared playback session comprises a request to add a media content item to the shared playback session

612 — The request to modify playback of the shared playback session comprises a request to skip, pause, play, or rewind the first media content item that is currently presented on the set of presentation devices

614 — The set of observer devices do not present media content

616 — In response to the request to modify playback of the shared playback session, determine an action to take with respect to the shared playback session

618 — In response to determining the action to take with respect to the shared playback session, send a command for the action to each of the set of presentation devices.

SYSTEMS AND METHODS FOR CREATING A SHARED PLAYBACK SESSION

PRIORITY APPLICATION

The application claims priority to U.S. Provisional Application No. 63/046,535, filed Jun. 30, 2020, which is hereby incorporated by reference in its entirety.

TECHNICAL FIELD

The disclosed embodiments relate generally to media playback, and, in particular, to modifying presentation of media content in shared playback sessions.

BACKGROUND

Access to electronic media, such as music and video content, has expanded dramatically over time. As a departure from physical media, media content providers stream media to electronic devices across wireless networks, improving the convenience with which users can digest and experience such content.

SUMMARY

Some embodiments of the present disclosure provide shared listening sessions (also referred to as "shared playback sessions" throughout the present disclosure). In a shared listening session, a plurality of users can add media content to be played back to a group (either on a single presentation device, e.g., at a party, or on each user's individual device at remote locations). For example, each user participating in the shared listening session is able contribute to and control a collection of media content (e.g., a collectively-generated queue), which is played back simultaneously to each of the users in the group (either using a presentation system common to the group, such as a speaker in a room with all of the users, or separately, using the user's individual devices). In this way, each of a plurality of users may access, contribute to, and control playback of a shared queue.

For the most part, devices that are participating in a shared listening session each playback the same content at substantially the same time. However, some users have different limitations on what content they can listen to (e.g., some users receive advertisements, some users can skip or pause content, etc.). A system is needed to support the functionality of the shared playback session, including forwarding commands from multiple client devices to a master device that controls playback of the media content in the shared playback session. The master device receives commands from the various clients and decides what, if any, actions to take. The master device then forwards the action instruction to the client devices. Each of the client devices receives the media content from one or more media content servers (e.g., the content is not shared from the master device to the client devices).

To that end, a method is performed at a first client device associated with a first user hosting a shared playback session, the first client device being a master device for the shared playback session. The method includes, while a first media content item from the shared playback session is being presented on a set of presentation devices, each of the set of presentation devices corresponding to a respective user of a plurality of users in the shared playback session, communicating with a set of observer devices for the shared playback session, each observer device also corresponding to a respective user of the plurality of users in the shared playback session. A respective device of the set of presentation devices, corresponding to a respective user of the plurality of users, is different from an observer device of the set of observer devices corresponding to the same respective user. The method includes receiving a request to modify playback of the shared playback session from a second client device, the second client device being one observer device of the set of observer devices. The method further includes, in response to the request to modify playback of the shared playback session, determining an action to take with respect to the shared playback session. The method further includes, in response to determining the action to take with respect to the shared playback session, sending a command for the action to each of the set of presentation devices.

In accordance with some embodiments, a first client device includes one or more processors and memory storing one or more programs configured to be executed by the one or more processors. The first client device is associated with a first user hosting a shared playback session, and is a master device for the shared playback session. The one or more programs include instructions for, while a first media content item from the shared playback session is being presented on a set of presentation devices, each of the set of presentation devices corresponding to a respective user of a plurality of users in the shared playback session, communicating with a set of observer devices for the shared playback session, each observer device also corresponding to a respective user of the plurality of users in the shared playback session. A respective device of the set of presentation devices, corresponding to a respective user of the plurality of users, is different from an observer device of the set of observer devices corresponding to the same respective user. The one or more programs include instructions for receiving a request to modify playback of the shared playback session from a second client device, the second client device being one observer device of the set of observer devices. The one or more programs include instructions for, in response to the request to modify playback of the shared playback session, determining an action to take with respect to the shared playback session. The one or more programs include instructions for, in response to determining the action to take with respect to the shared playback session, sending a command for the action to each of the set of presentation devices.

In accordance with some embodiments, a computer-readable storage medium has stored therein instructions executable by a first client device. The first client device is associated with a first user hosting a shared playback session, and is a master device for the shared playback session. The one or more programs include instructions for, while a first media content item from the shared playback session is being presented on a set of presentation devices, each of the set of presentation devices corresponding to a respective user of a plurality of users in the shared playback session, communicating with a set of observer devices for the shared playback session, each observer device also corresponding to a respective user of the plurality of users in the shared playback session. A respective device of the set of presentation devices, corresponding to a respective user of the plurality of users, is different from an observer device of the set of observer devices corresponding to the same respective user. The one or more programs include instructions for receiving a request to modify playback of the shared playback session from a second client device, the second client device being one observer device of the set of observer devices. The one or more programs include instructions for, in response to the request to modify playback of the shared playback session, determining an action to take with respect to the shared playback session. The one or more programs include instructions for, in response to determining the action to take with respect to the shared playback session, sending a command for the action to each of the set of presentation devices.

Thus, systems are provided with improved methods for providing information associated with media content items based on a proxy media content item.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 6A-6B are flow diagrams illustrating a method of generating a shared playback session, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
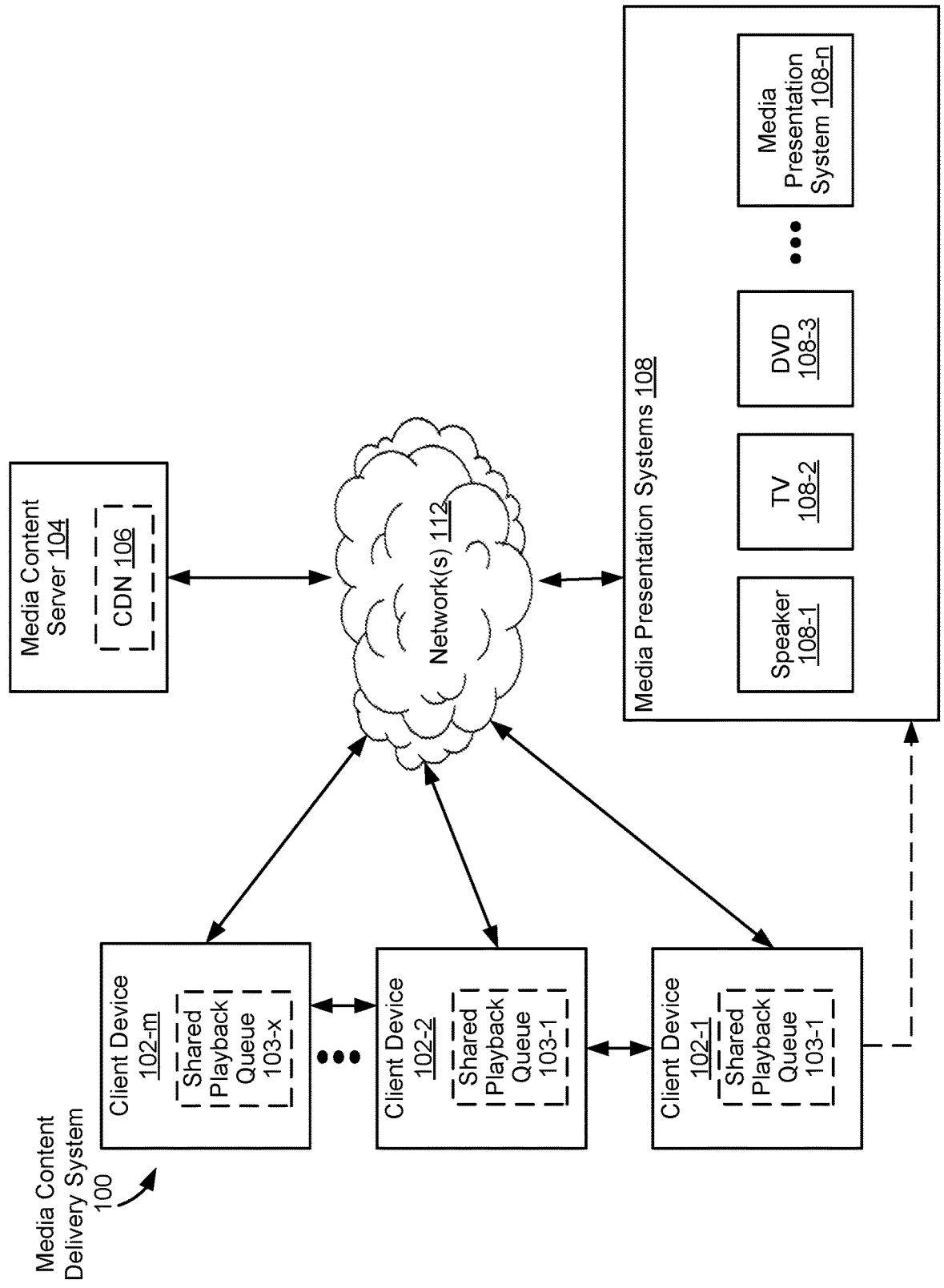
FIG. 1 is a block diagram illustrating a media content delivery system, in accordance with some embodiments.

FIG. 1 is a block diagram illustrating a media content delivery system 100 in accordance with some embodiments. The media content delivery system 100 includes one or more client devices 102 (e.g., client device 102-1 to client device 102-m, where m is an integer greater than one), one or more media content servers 104, and one or more media presentation systems 108, including speaker 108-1, television (TV) 108-2, digital versatile disk (DVD) player 108-3, and/or other media presentation system 108-n (where n is an integer greater than three). The one or more media content servers 104 are associated with (e.g., at least partially compose) a media-providing service. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, a client device 102-1, 102-2, or 102-m is associated with one or more users. In some embodiments, a client device 102 is a personal computer, mobile electronic device, wearable computing device, laptop computer, tablet computer, mobile phone, feature phone, smart phone, digital media player, or any other electronic device capable of presenting media content (e.g., audio and/or video). A client device 102 connects to a media presentation system 108 wirelessly or through a wired connection (e.g., directly through an interface, such as an HDMI interface). In some embodiments, a client device 102 is a headless client. In some embodiments, client devices 102-1 and 102-m are the same type of device (e.g., client device 102-1 and client device 102-m are both mobile devices). Alternatively, client device 102-1 and client device 102-m are different types of devices.

In some embodiments, client devices 102-1, 102-2, and 102-m send and receive media-control information through the networks 112. For example, client devices 102-1, 102-2, and 102-m send media control requests (e.g., requests to play music, movies, videos, or other media items, or playlists thereof) to media content server 104 through network(s) 112. In some embodiments, client devices 102-1, 102-2, and 102-m, receive authentication tokens from the media content server 104 through network(s) 112.

In some embodiments, client device 102-1 communicates directly (e.g., through a wired and/or wireless connection) with client devices 102-2 and/or 102-*m*. For example, in some embodiments client devices 102 directly communicate playback commands and/or audio code signals between each other (e.g., the media content server 104 may or may not be involved in the exchange). In some embodiments, client device 102-2 communicates directly with client device 102-*m*. In some embodiments, client device 102-1 communicates directly with media presentation systems 108. As pictured in FIG. 1, client device 102-1 is able to communicate directly (e.g., through a wired and/or wireless connection) with media presentation systems 108, while client device 102-*m* communicates with the media presentation systems 108 through network(s) 112. In some embodiments, client device 102-1 uses the direct connection with media presentation systems 108 to stream content (e.g., data for media items) for playback on the media presentation systems 108.

In some embodiments, client device 102-1, client device 102-2 and client device 102-*m* each include a media application 222 (FIG. 2) that allows a user of the client device to browse, request (e.g., for playback at the client device 102 and/or a media presentation system 108), and/or present media content (e.g., control playback of music tracks, videos, etc.). Media content may be stored locally (e.g., in memory 212 of the client device 102, FIG. 2) and/or received in a data stream (e.g., from the media content server 104). The media presentation system 108 may be part of the client device 102, such as built-in speakers and/or a display, or may be separate from the client device 102, such as a wirelessly coupled speaker (e.g., speaker 108-1).

In some embodiments, client device 102-1 and client device 102-2 each include an instance of shared playback queue 103-1 (e.g., within media application 222). In some embodiments, shared playback queue 103-1 includes a set (e.g., an ordered list, such as a playlist) of media content items provided by the media content server 104. For example, the media content server 104 establishes a shared playback session (e.g., for two or more client devices of two or more users), stores a shared playback queue corresponding to the shared playback session, and/or provides the shared playback queue to the two or more client devices (e.g., client device 102-1 and client device 102-2). In some embodiments, the two or more client devices 120 are enabled to view and/or edit (e.g., add, remove, and/or reorder) content in the shared playback queue. For example, client device 102-1 and client device 102-2 are each provided with at least a portion of the same shared playback queue 103-1. In some embodiments, the shared playback queue 103-1 includes media content items selected by any combination of client device 102-1, client device 102-2, any other client device(s) 102, presentation systems 108, and/or the media content server 104. In some embodiments, the media content items from the shared playback queue are streamed to (e.g., played at and/or provided to) one or more of media presentation systems 108. For example, each client device 102-1 and client device 102-2 accesses (e.g., views, edits (adds and/or removes media content items from), and/or controls presentation of) the shared playback queue 103-1 while the shared playback queue is presented at one or more of media presentation systems 108. Co-located users are enabled to access the shared playback queue 103-1 on individual devices while streaming media content through media presentation system 108. In some embodiments, the media content items from the shared playback queue are streamed to each of the client devices 102-1 and 102-2 (e.g., instead of or in addition to media presentation system 108). It is to be understood that the shared playback queue 103-1 is enabled to be shared on additional client devices 102 in addition to client device 102-1 and client device 102-2. In some embodiments, a shared playback queue 103-*x* (distinct from shared playback queue 103-1) is shared between a plurality of client devices 102 (including client device 102-*m*). For example, the media content server 104 provides a plurality of shared playback queues 103-1 through 103-*x*, where the shared playback queue 103-1 is provided to a first subset of client devices 102 (e.g., client devices 102-1 and 102-2) and the shared playback queue 103-*x* is provided to a second subset of client devices 102 (e.g., including client device 102-*m*) (e.g., distinct from the first subset).

In some embodiments, the media content server 104 stores and provides media content (also referred to as media items) (e.g., media content requested by the media application 222 of client device 102-1, 102-2, and/or 102-*m*, and/or the shared playback queue 103-1) to client devices 102 and/or media presentation systems 108 via the network(s) 112. Content stored and served by the media content server 104, in some embodiments, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. For example, the media content server 104 includes or is coupled to a Content Distribution Network (CDN) 106 for distributing media content. In some embodiments, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-*n*) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some embodiments, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

In some embodiments, a first user joins (e.g., initiates) a shared playback session with one or more other uses, including a second user. In some embodiments, the electronic device (e.g., session master 402, FIG. 4) initiates the shared playback session by generating a shared playback queue (e.g., shared playback queue 103-1). For example, the shared playback queue includes media content items that are requested from the users that participate in the shared playback session.

Figure 2:
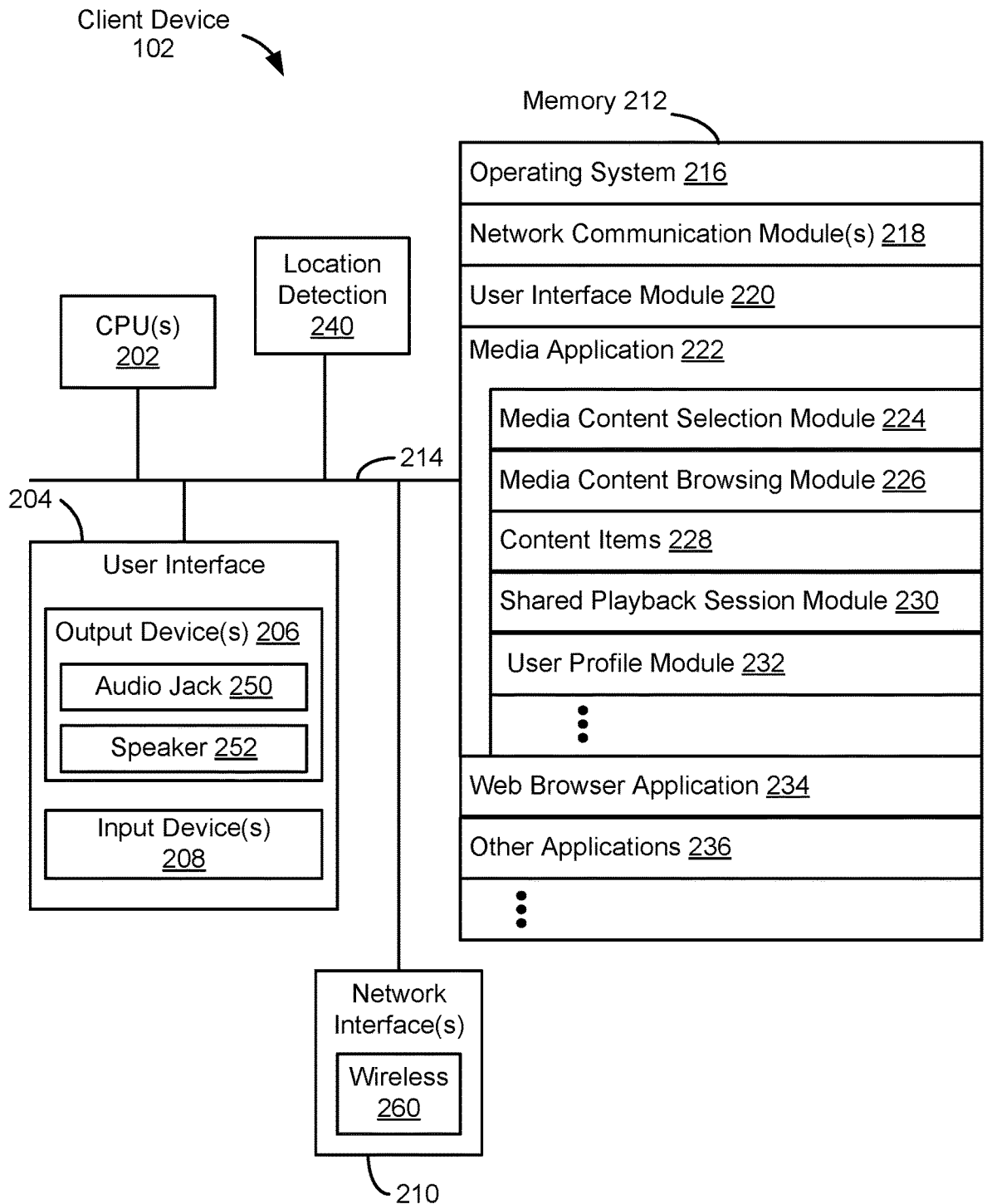
FIG. 2 is a block diagram illustrating a client device, in accordance with some embodiments.

FIG. 2 is a block diagram illustrating an client device 102 (e.g., client device 102-1 and/or electronic device 102-m, FIG. 1), in accordance with some embodiments. The client device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the client device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 240, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some embodiments, the one or more network interfaces 210 include wireless and/or wired interfaces for receiving data from and/or transmitting data to other client devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some embodiments, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some embodiments, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s) 108, media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a media content selection module 224 for selecting one or more media content items and/or sending, to the media content server, an indication of the selected media content item(s);
  - a media content browsing module 226 for providing controls and/or user interfaces enabling a user to navigate, select for playback, and otherwise control or interact with media content, whether the media content is stored or played locally or remotely;
  - a content items module 228 for processing uploaded media items and storing media items for playback and/or for forwarding to the media content server;

a shared playback session module 230 for initiating, joining and/or modifying shared playback sessions; and a user profile module 232 for generating and/or storing information about a user of the client device, including storing permissions, granted by a media content provider, that are associated with the user profile.

a web browser application 234 (e.g., Internet Explorer or Edge by Microsoft, Firefox by Mozilla, Safari by Apple, or Chrome by Google) for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
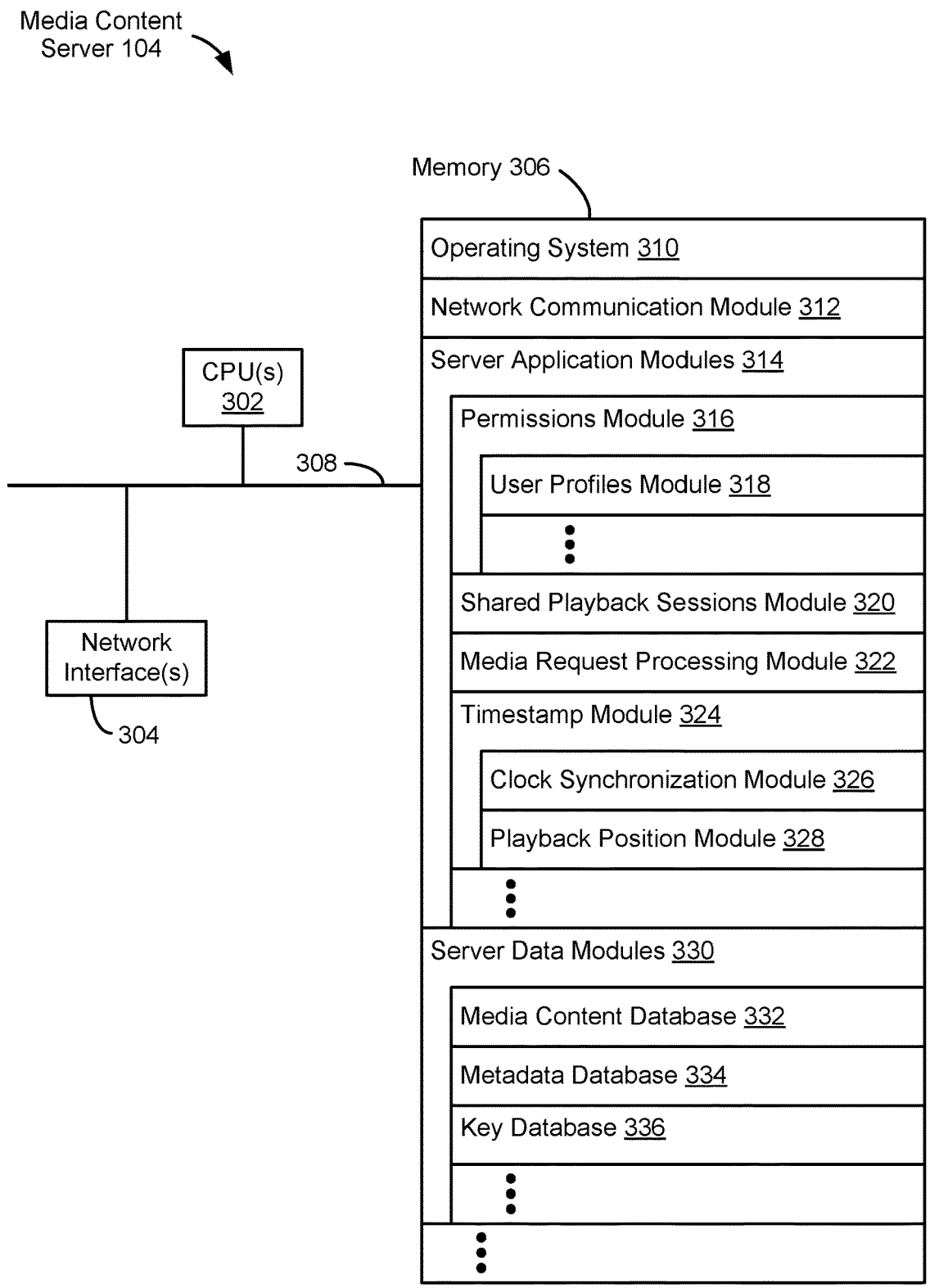
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a permissions module 316 for generating and/or storing permissions and access (e.g., control) rights for user accounts, including:

a user profile module 318 for storing a profile of a user associated with client devices and generating and/or storing the associated permission and access rights for each user profile; and shared playback sessions module 320 for performing various functions with respect to providing and managing shared playback sessions;

a media request processing module 322 for processing requests for media content and facilitating access to requested media items by client devices (e.g., the client device 102) including, optionally, streaming media content to such devices and/or to one or more media presentation system(s) 108;

a timestamp module 324 for providing indications of timing (e.g., of current time and/or timing related to playback of a media content item), including, but not limited to, one or more of:

a clock synchronization module 326 for generating and/or sending, to an electronic device, a clock synchronization signal or other timing information, such as, to synchronize media content in a shared playback session; and a playback position module 328 for processing (e.g., identifying and/or providing to the electronic device) timing information related to playback of a media content item;

one or more server data module(s) 330 for handling the storage of and/or access to media items and/or metadata relating to the media items; in some embodiments, the one or more server data module(s) 330 include:

a media content database 332 for storing media items;
a metadata database 334 for storing metadata relating to the media items; and
a key database 336 for storing keys related to account information for user media accounts, such as user profiles, credentials (e.g., user identifiers, passwords, email addresses, etc.), and/or identifiers of any linked accounts.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
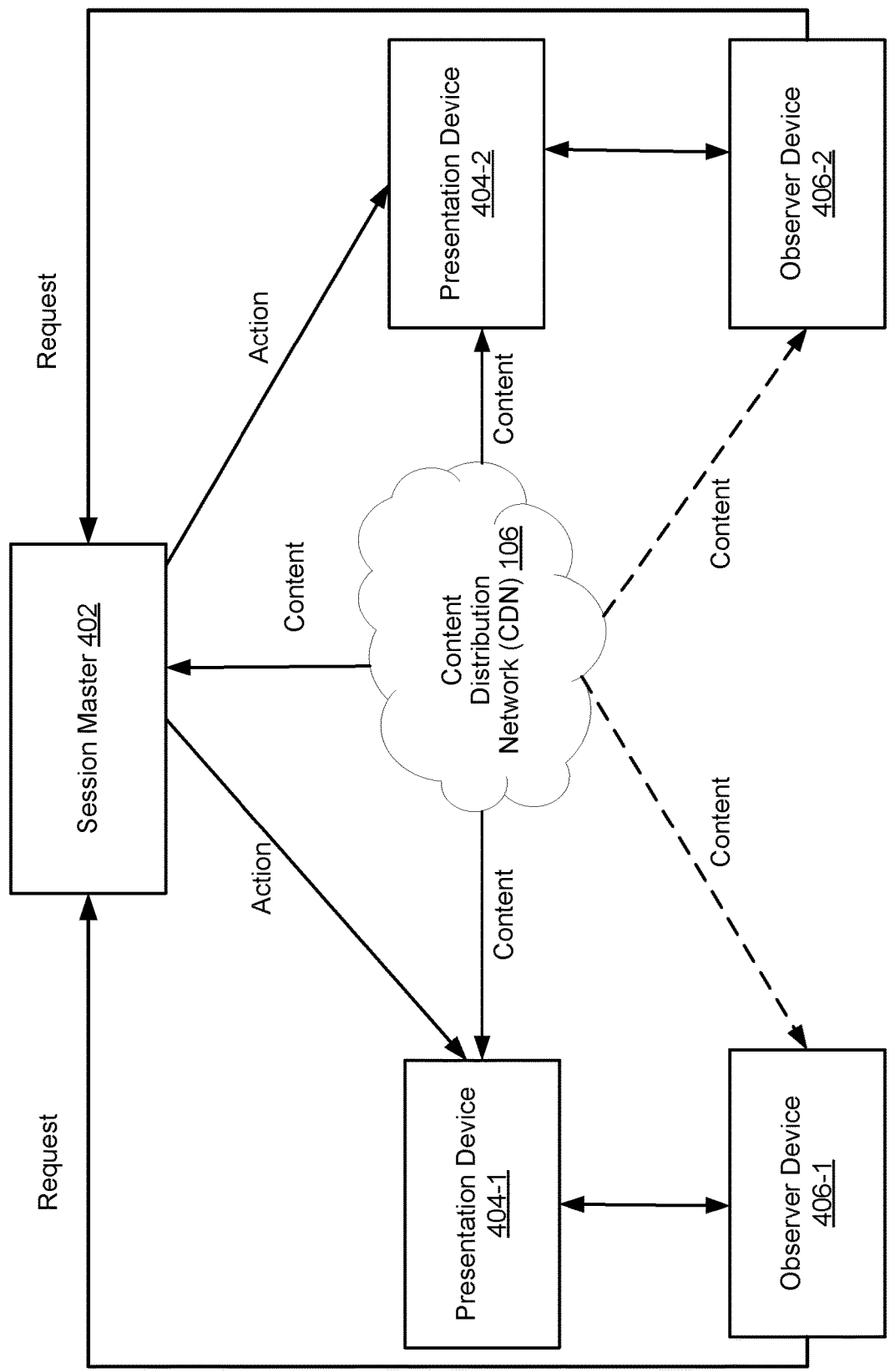
FIG. 4 is a block diagram illustrating a system architecture for managing shared playback sessions, in accordance with some embodiments.

FIG. 4 is a block diagram illustrating a first system architecture for a shared playback session. In FIG. 4, session master 402 and/or any of the observer devices 406 may be a client device 102 as disclosed herein (e.g., with reference to FIG. 1) In some embodiments, a host device (e.g., session master 402) is identified for the playback session. In some embodiments, the host device comprises a playback device that is associated with a user that initiates the shared playback session. In some embodiments, the host device is automatically assigned to a playback device in the shared playback session (e.g., media server 104 selects a host device). In some embodiments, the users participating in the shared playback session select the host device. In some embodiments, the host device plays back media content from the shared playback queue. For example, the host device comprises a speaker system of the user that initiates the shared playback session.

In some embodiments, the host device is communicatively coupled to an observer device (e.g., a host-observer device) (not shown in FIG. 4). In some embodiments, the host device (e.g., session master 402) is communicatively coupled to one or more presentation devices 404 (e.g., 404-1 and 404-2), which present media content in a shared playback session. Examples of the one or more presentation devices are described with reference to media presentation systems 108 (e.g., a speaker system). In some embodiments, the host device also acts as a presentation device. In some embodiments, presentation devices 404 (e.g., and session master 402) receive media content from CDN 106. For example, the presentation devices 404 and session master 402 present the media content provided from CDN 106. In some embodiments, the presentation devices 404 are communicatively coupled with one or more observer devices 406. For example, observer device 406-1 is aware (e.g., by receiving data indicating) of a current playback state of presentation devices 404.

In some embodiments, observer device(s) participating in the shared playback session do not present content from the shared playback session. Instead, only the presentation devices 404-1 and 404-2 playback the media content. For example, observer devices (e.g., observer device 406-1 and observer device 406-2) are communicatively coupled with presentation devices 404-1 and 404-2, respectively. In some embodiments, the observer devices 406 are connected to CDN 106 (e.g., via networks 112), such that the observer devices 406 receive information about the media content in the shared playback session. For example, observer devices 406 comprise a mobile phone on which a user can browse for content, see the content that is included in the shared playback session (e.g., view the shared playlist), and input control commands (e.g., requests) for the shared playback session. In some embodiments, presentation devices 404 present the same media content (e.g., received from CDN 106) from the shared playback session at substantially the same time.

In some embodiments, presentation device 404-1 and observer device 406-1 are distinct types of devices. For example, presentation device 404-1 is a speaker system and observer device 406-1 is a mobile phone. In some embodiments, presentation device 404-1 and observer device 406-1 are the same type of device. In some embodiments, presentation device 404-1 is associated with a same user as observer device 406-1. For example, the presentation device 404-1 is selected by the observer device 406-1 (e.g., via a device-picker interface) to playback content at the presentation device 404-1 (without playing back the content at observer device 406-1). In some embodiments, in accordance with presentation device 404-1 being selected by the observer device 406-1, presentation device 404-1 is associated with (e.g., by the media content server 104) a same user account as a user account of observer device 406-1. In some embodiments, the presentation device 404-1 and observer device 406-1 are logged into a same user account. For example, each user that is participating in the shared playback session is associated with one or more observer devices and one or more presentation devices, where the observer devices are used to control playback (e.g., by sending requests for the session master to execute the command, as described in more detail below) and the presentation devices present the media content items.

In some embodiments, observer devices 406 (e.g., 406-1 and 406-2) send requests (e.g., directly) to update the shared playback session to session master 402. For example, observer devices 406 send requests to add or remove media content from the shared playback session queue. In some embodiments, observer devices 406 send requests to pause, play, skip, replay, or rewind currently playing media content. In some embodiments, observer devices 406 send requests to the respective presentation device associated with the observer device, and the presentation device forwards the request to the session master 402. In some embodiments, the observer device only sends requests directly to the session master (e.g., without sending the request to the presentation device). In some embodiments, a direct request from the presentation device to the session master is sent via network (s) 112. In some embodiments, the observer device sends requests to session master 402 via media content server 104 (e.g., with or without sending the request to a presentation device).

In some embodiments, in response to receiving the one or more requests, the session master 402 determines an action to take (e.g., based on the request and the user associated with the request). In some embodiments, the session master 402 sends, to presentation devices 404 (e.g., 404-1 and 404-2), a command indicating an action to be executed by the presentation devices 404. In some embodiments, the session master 402 sends the same command to each of the presentation devices 404. In some embodiments, the session master 402 sends a different command to different presentation devices. For example, the session master 402 determines the capabilities of the presentation devices (e.g., the permissions of the users associated with the presentation devices) and sends respective commands based on the respective capabilities. For example, the session master 402 sends a first command for taking a first action to presentation device 404-1 (e.g., to pause media content) and sends a second command for taking a second action to presentation device 404-2 (e.g., to do nothing/not pause the media content). For example, presentation device 404-1 has permission to pause content, whereas presentation device 404-2 is determined to not have permission to pause content. In some embodiments, the permissions of each respective device (e.g., the user associated with each device) is stored at media content server 104 (e.g., in permissions module 316).

Figure 5:
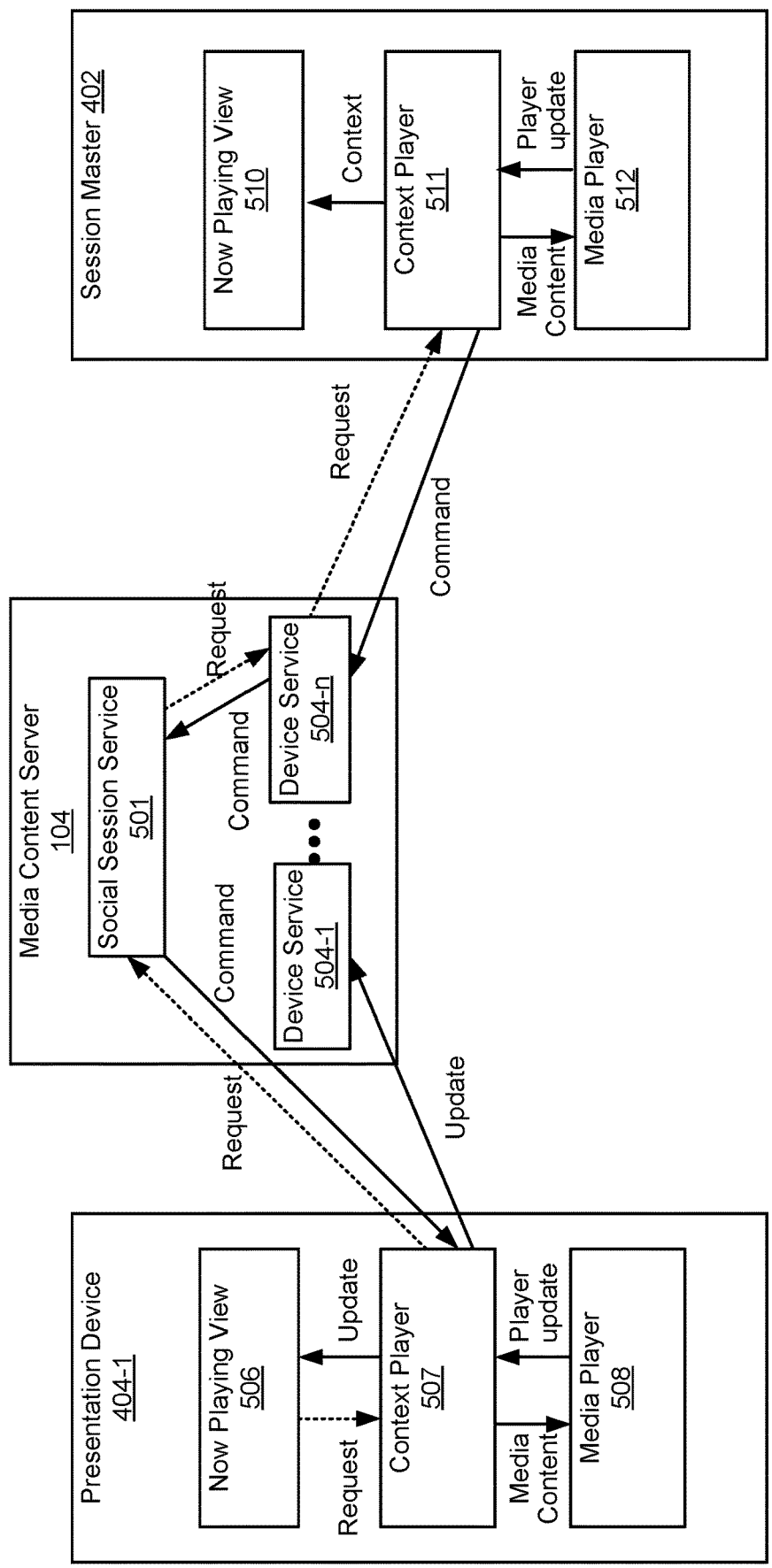
FIG. 5 is a block diagram illustrates a device architecture for sending commands in a shared playback session, in accordance with some embodiments.

FIG. 5 is a block diagram illustrating a device-level architecture for sending commands between a presentation device and a session master. For example, in some embodiments, presentation device 404-1 includes modules, such as now playing view 506, Context Player 507, and Media Player 508. As described above, in some embodiments, presentation device receives a request initiated at an observer device. In some embodiments, session master 402 includes modules corresponding to the modules of presentation device 404-1, such as now playing view 510, Context Player 511, and Media Player 512. Session master 402 uses these modules to communicate context and media content items, and to update a current state of the media player.

In some embodiments, media content server 104 includes a Device Service module (e.g., device service modules 504-1 through 504-*n*) for each of the presentation devices 404 (e.g., and/or observer devices), and for the session master 402. For example, the media content server uses Device Service modules 504 to track a current status of each of the presentation devices participating in the shared playback session. For example, each presentation device includes a Context Player 507 to send updates of the current status of the presentation device.

In some embodiments, presentation device 404-1 includes the functionality of an observer device (e.g., the presentation device 404-1 is also an observer device that can make requests). For example, in FIG. 5, presentation device 404-1 receives a request from Now Playing View 506. A user selects a control (e.g., via a user interface) in the Now Playing View 506 to skip a currently playing media content item. The Now Playing View 506 initiates the request (e.g., in response to the user input selecting the control) and sends it to Context Player 507. Context Player 507 forwards the request to Social Session Service module 501 at media content server 104. Social Session Service module 501 then forwards the request to the corresponding Device Service 504, which is communicatively coupled to session master 402. The corresponding Device Service 504 sends the request to Context Player 511 of session master 402. Session master 402 determines an action to take in response to receiving the request. Session master 402 (e.g., using Context Player 511) sends a command indicating the action to Device Service 504 at the media content server 104, which then forwards the command to Social Session Service module 501. The command is forwarded from Social Session Service module 501 to presentation device 404-1 (e.g., Context Player 507). Context Player 507 further sends media content to Media Player 508 such that the presentation device 404-1 presents the indicated media content (e.g., based on the received command). Media Player 508 is enabled to play back a respective media content item, while Context Player 507 tracks a context (e.g., an artist, album, title, playlist, etc.) associated with the respective media content item. Media Player 508 sends player updates to Context Player 507 such that Context Player 507 is updated as to the state of the currently presented media content. In some embodiments, sending the player updates to Context Player 507 comprises sending a context of the currently presented media content. Then, Context Player 507 sends an update (e.g., including the context) to the Now Playing View 506 and Device Service 504-1 to reflect (e.g., execute) the action received in the command.

Figure 6B:
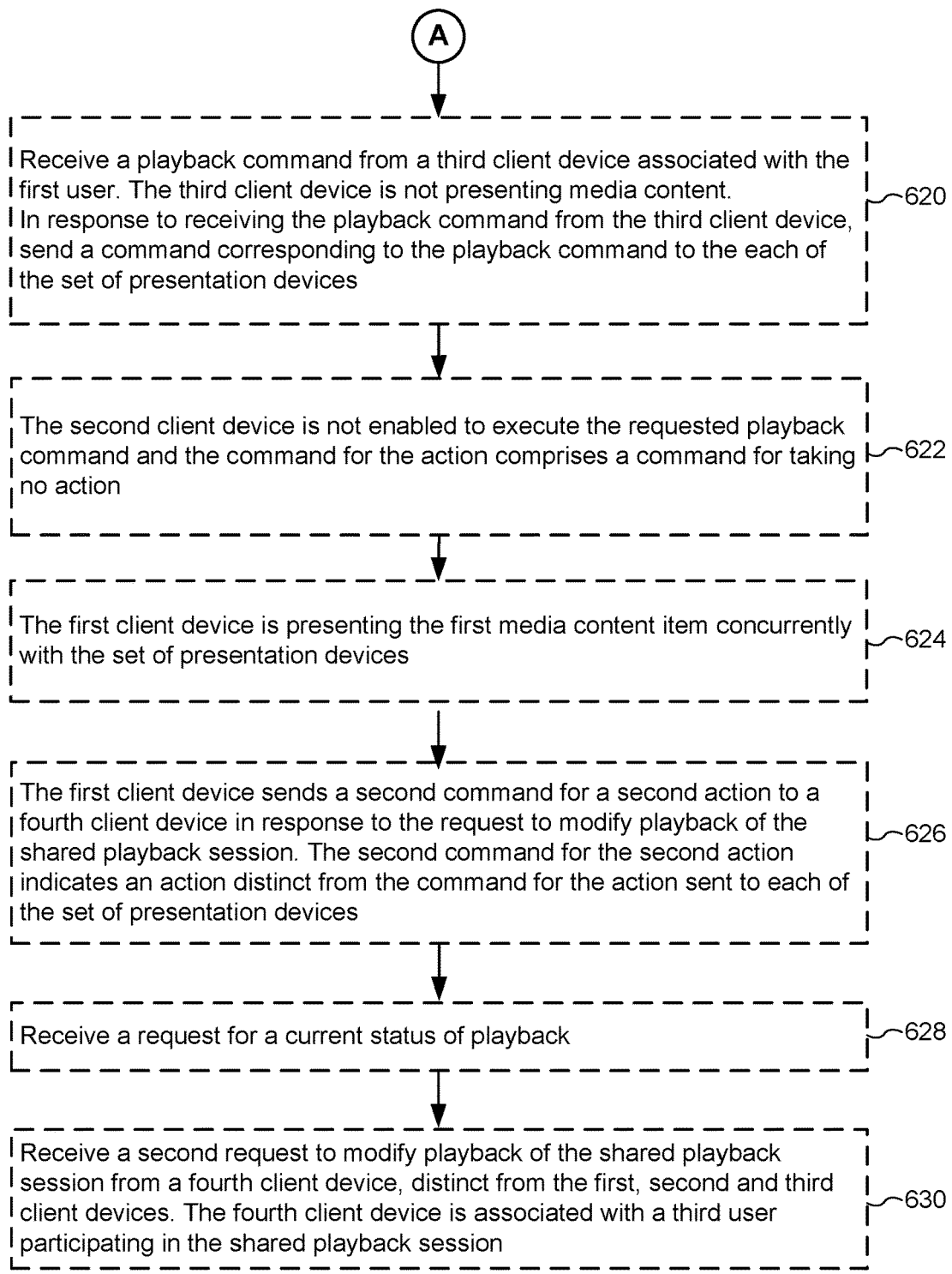

FIGS. 6A-6B are flow diagrams illustrating a method 600 for sending commands in a shared playback session, in accordance with some embodiments. Method 600 may be performed (602) at a first client device (e.g., electronic device 102-1, session master 402), the client device having one or more processors and memory storing instructions for execution by the one or more processors. In some embodiments, the method 600 is performed by executing instructions stored in the memory (e.g., memory 212, FIG. 2) of the client device. In some embodiments, the method 600 is performed by a combination of the server system (e.g., including media content server 104 and CDN 106) and an electronic device (e.g., a client device). In some embodiments, the server system provides media content items for playback to the electronic device(s) 102 of the media content delivery system 100.

In some embodiments, the first client device is associated with a first user hosting a shared playback session. The first client device is a master device for the shared playback session. For example, the first client device comprises master device 402, which is hosting the shared playback session.

In some embodiments, a first media content item from the shared playback session is presented (604) on a set of presentation devices. For example, presentation devices 404-1 and 404-2 (e.g., as well as session master device 402) present media content from the shared playback session. Each of the set of presentation devices corresponds to a respective user of a plurality of users in the shared playback session. For example, the session master 402 is a presentation device associated with the first user, presentation device 404-1 is associated with a second user, and presentation device 404-2 is associated with a third user (e.g., where the first, second, and third users are distinct users). In some embodiments, the first client device (e.g., session master 402) communicates (606) with a set of observer devices for the shared playback session. For example, as shown in FIG. 4, requests are sent from observer devices 406-1 and 406-2 to session master 402.

Each observer device also corresponds to a respective user of the plurality of users in the shared playback session. For example, observer device 406-1 is associated with a second user and observer device 406-2 is associated with a third user.

In some embodiments, a respective device of the set of presentation devices, corresponding to a respective user of the plurality of users, is different from an observer device of the set of observer devices corresponding to the same respective user. For example, presentation device 404-1 and observer device 406-1 are both associated with the second user, but presentation device 404-1 is a distinct device from observer device 406-1. For example, presentation device 404-1 is a speaker system that presents the media content, while observer device 406-1 is a mobile phone for controlling playback (e.g., of the presentation device 404-1 and/or the shared playback session).

In some embodiments, the first client device receives (608) a request to modify playback of the shared playback session from a second client device, the second client device being one observer device of the set of observer devices. For example, observer device 406-1 sends, to session master 402, a request to modify playback of the shared playback session. In some embodiments, the request to modify playback of the shared playback session comprises (610) a request to add (e.g., or remove) one or more media content items to the shared playback session.

In some embodiments, the request to modify playback of the shared playback session comprises (612) a request to skip, pause, play, or rewind the first media content item that is currently presented on the set of presentation devices.

In some embodiments, commands are not sent between presentation devices (or observer devices). For example, if multiple user devices (e.g., without a session master) send commands between all of the participating devices, a "ping-ponging" of commands occurs, where a same command is received multiple times from multiple other devices. In some embodiments, to avoid this repeating of multiple commands, a tiered system is generated with only one master device that receives all of the requests from the other participating devices. For example, the master device (e.g., session master 402) processes all of the requests, decides an action to take, and sends the action to the participating devices. This improves the efficiency of the system and decreases the amount of bandwidth required to send repetitive requests among the plurality of presentation and/or observer devices. In addition, this decreases the processing power of the presentation and/or observer devices required to playback media content because the presentation devices are not required to filter through a plurality of repeated commands (e.g., requests) that correspond to a same action.

In some embodiments, the set of observer devices do not present (614) media content (e.g., none of the set of observer devices presents the first media content item). For example, the set of observer devices provide a user with controls (e.g., to make requests to modify the shared playback session) and/or with a graphical user interface where the user can access a queue of media content items that are included in the shared playback session. In some embodiments, a plurality of observer devices are communicatively coupled to a presentation device. For example, a plurality of co-located observer device (e.g., which may be associated with a plurality of users) communicate with a single presentation device that is playing back content. Thus, the plurality of observer devices can send (e.g., to the session master) requests to control the presentation device.

In response to the request to modify playback of the shared playback session, the first client device determines (616) an action to take with respect to the shared playback session. For example, after receiving a request from observer device 406-1 to pause the currently playing media content item, session master 402 decides whether to take an action (e.g., pause playback) for all (e.g., or a subset) of the participating presentation devices in the session.

In response to determining the action to take with respect to the shared playback session, the first client device sends (618) a command for the action to each of the set of presentation devices. For example, the session master 402 decides to pause the shared playback session for all of the presentation devices 404, and thus the session master 402 sends an action command to each of the presentation devices 404, where the action command specifies an instruction to pause the playback of media content at the presentation devices. In some embodiments, the same command for the action is sent to each of the set of presentation devices. For example, although one or more users do not have accounts that permit the user to pause the media content, when the session master 402 sends a command to pause the media content, all of the presentation devices 404 in the set of presentation devices are able to execute the command (e.g., the command from the session master 402 overrides the limitations of the account).

In some embodiments, the first client device determines an action to take with respect to the shared playback session that is based at least in part on a user profile of the second client device. For example, the session master 402 determines whether the user that is associated with observer device 406-1 is granted authorization to complete the requested action (e.g., if the user requesting the action has authorization, then the first client device determines to take the action, but if the user requesting the action does not have authorization, then the first client device determines to not take the action). For example, some users are given permission to pause, skip, and request particular media content items (e.g., based on a profile of the user, such as whether the user is a premium/paid user or a free user). In some embodiments, some users have permission to take certain actions, while other users do not have permission to take the actions. For example, user 1 has permission to skip a media content item, while user 2 does not have permission to skip a media content item. In some embodiments, the user permissions are used by the session master 402 to determine what action to take for the shared playback session.

In some embodiments, the first client device has limited permissions. For example, the host of the shared playback session is not a user with a premium account and does not have permission to take certain actions (e.g., and thus cannot request specific songs, and/or pause media content, etc.). In some embodiments, when the first client device has limited permissions, the shared listening session is subject to the limited permissions. For example, the host device cannot send a command for an action when the host device does not have permission to execute the action. In some embodiments, despite the host device not having the permission to execute the action, the host device is still able to send the command for the action to the set of presentation devices. For example, where the set of presentation devices do have permission to execute the action, the host device sends to command for the action (e.g., without the host device taking the action itself). In some embodiments, where some presentation devices have permission to execute the command, a difference in content presented among users in the shared playback session is generated. For example, while some presentation devices (e.g., associated with premium users) skip content, other presentation devices in the shared playback session (e.g., associated with free users) cannot skip content and are no longer in synchronization with a portion of the presentation devices in the shared playback session. For example, a session master makes the decisions about controlling playback commands and sends different commands to different devices in the playback session depending on the account associated with each device. This allows for users that have different accessibility to media content to participate in a shared playback session. Although some users (e.g., free accounts) have less control in a shared playback session because of the limitations on their account, it is possible for these users to participate in a same shared playback session with users without limitations on their account.

In some embodiments, different users are provided different content during the shared playback session. For example, user 1 is not provided with advertisements, while user 2 is periodically provided with an advertisement. Thus, although the first user and the second user are both participating in the shared playback session, in some embodiments, the first user and the second user playback different media content items (e.g., user 1 plays back a media content item from the shared playback queue while user 2 plays back an advertisement). In some embodiments, after providing user 2 with an advertisement, user 2 is then presented with a currently presented media content item (e.g., starting at a point within the media content item based on the current position in the shared playback session). For example, while the shared playback session initiates playback of a new media content item, user 2 is presented with different content (e.g., a 30-second advertisement), and then user 2 is presented with a portion of the new media content item (e.g., without presenting the first 30-seconds of the new media content item) to synchronize user 2 with the current playback of the shared playback session.

In some embodiments, the second client device is granted temporary access to carry out the requested modification of playback before the session master sends the action to take with respect to the shared playback session (e.g., subject to the first client device making the final decision). For example, observer device 406-1 sends a request to session master 402 to pause the currently playing media content item. In response to sending the request, observer device 406-1 sends an immediate request to presentation device 404-1 that instructs the presentation device to pause the media content. The observer device 406-1 is thus able to immediately pause the media content item playing at presentation device 404-1 without waiting for the session master 402 to send the action to presentation device 404-1. In some embodiments, the request sent to the session master 402 and the request sent to the presentation device 404-1 are sent at substantially the same time. In some embodiments, the requests are two distinct requests. In some embodiments, the requests comprise a same request that is sent to both the session master and the presentation device. In some embodiments, the observer device sends an immediate request to a presentation device that is associated with a same user with whom the observer device is associated.

For example, when a participant (e.g., user) sends a playback command that is routed to the session master, the participant may experience a lag between the command and the action. To address this problem, in some embodiments, the participant's device locally makes a (temporary) decision to immediately execute the command, and then the master determines the final decision and sends the action to the participant's device (e.g., to leave as is or to change).

In some embodiments, after the presentation device 404-1 is granted immediate (e.g., temporary) permission to execute the request from the observer device 406-1, session master 42 sends an overriding command (e.g., corresponding to the command sent to the set of presentation devices) to the presentation device 404-1. In some embodiments, the overriding command is a command to take the action that the presentation device already took (e.g., in response to the request received directly from observer device 406-1). In some embodiments, the overriding command is a different command that does not allow the presentation device to take the action that it took in response to the request received directly from observer device 406-1. For example, if session master 402 determines that the user associated with observer device 406-1 (e.g., and presentation device 404-1) does not have permission to pause the currently playing media content item, session mater 402 sends an action command to presentation 404-1 that begins playback of the content (e.g., forgoes pausing the content). Thus, the session master 402 is enabled to override an immediate command sent from observer device 406-1 in accordance with a determination that the user associated with observer device 406-1 does not have permission to execute the command.

In some embodiments, at least one device of the set of presentation devices is the same device as at least one observer device of the set of observer devices. For example, in some embodiments, instead of two distinct devices, the presentation device is a same device as observer device. For example, a single device is enabled to send requests to the session master and receive the action from the session master.

In some embodiments, the first client device receives (620) a playback command from a third client device associated with the first user, where the third client device is not presenting media content. For example, the first user (e.g., host) is associated with an observer device (not shown in FIG. 4) that is distinct from the session master 402 (e.g., which presents the media content). In some embodiments, the first user (e.g., using the third client device) sends the request to the session master 402. In some embodiments, in response to receiving the playback command from the third client device, the first client device (e.g., session master 402) sends a command corresponding to the playback command to the each of the set of presentation devices. For example, the third client device comprises the host user's phone, while the session master comprises a speaker system associated with the host user.

In some embodiments, the second client device is not enabled (622) to execute the requested playback command, (e.g., the user associated with the second client device lacks permission) and the command for the action comprises a command for taking no action. For example, session master 402 determines that observer device 406-1 does not have permission to pause content, and therefore the action sent by the session master 402 comprises an instruction that the presentation devices 404 do not pause playback. In some embodiments, the instruction is a blank instruction.

In some embodiments, the first client device is presenting (624) the first media content item concurrently with the set of presentation device (e.g., while the presentation device receives the command for the action). For example, at least one of the set of presentation devices (e.g., including presentation devices 404-1 and 404-2) concurrently present the first media content item while the session master 402 also presents the first media content item (e.g., and while the session master 402 receives a request from an observer device 406). In some embodiments, the set of presentation devices and the session master play back the same content at substantially the same time. For example, all of the presentation devices play content from the shared playback session (e.g., subject to offset due to latency or the insertion of advertisements, etc.).

In some embodiments, the first client device sends (626) a second command for a second action to a fourth client device (e.g., where the fourth client device comprises a presentation device not in the set of presentation devices). For example, the session master 402 determines which of the presentation devices that are participating in the shared playback session have permission to carry-out the action, and sends the first command for the first action to the identified presentation devices, and sends a second command for the second action to the presentation devices that are not enabled to execute the first action. In some embodiments, the set of presentation devices have the same access (e.g., control) privileges and the fourth client device has different access privileges. For example, the second command for the second action indicates an action distinct from the command for the action sent to each of the set of presentation devices In some embodiments, the first client device receives (628) a request for a current status of playback (e.g., to synchronize playback). In various embodiments, the request for the current status of playback may be received from a presentation device (e.g., via the observer device) or received directly from an observer device (e.g., depending on who is initiates the request). For example, the session master 402 receives one or more requests for a playback status, and in response to the request, the session master 402 sends, to all the participating presentation devices in the listening session, timing information (e.g., and/or additional information) about the currently playing media content item (e.g., that is played back at the session master). In some embodiments, the session master 402 sends timing information and/or additional about the currently playing media content item only to the presentation device associated with the user that requested the current status of playback. For example, the user associated with observer device 406-1 requests the playback status, and in response to receiving the request, session master 402 sends timing information to presentation device 404-1 (e.g., which is associated with the same user as observer device 406-1). In some embodiments, the presentation device(s) that receive the information corresponding to the current status of playback update the currently playing media content item to match (e.g., synchronize with) the shared playback session.

In some embodiments, each of the set of presentation devices plays back the first media content item. For example, in the shared playback session, the set of presentation devices synchronize playback, even when the presentation devices are not co-located. In some embodiments, each of the presentation devices in the set of presentation devices streams media content that is presented in the shared playback session from a same server. For example, when the shared playback session is initiated, each of the presentation devices 404 access a same server (e.g., of CDN 106) such that the media content is streamed from the same server to each of the presentation devices. In some embodiments, the presentation devices 404 access at least two distinct servers. For example, the presentation devices 404 playback the same media content identified in the shared playback session, but receive the content from distinct sources. In some embodiments, the presentation devices 404 locally store media content (e.g., or observer devices 406 locally store media content), and the presentation devices 404 present the locally stored media content (e.g., instead of or in addition to media content items streamed from the server (CDN 106)).

In some embodiments, the first client device receives (630) a second request to modify playback of the shared playback session from a fourth client device, distinct from the first, second and third client devices. In some embodiments, the fourth client device is associated with a third user of the plurality of users participating in the shared playback session. For example, observer device 406-2 is associated with a third user. As illustrated in FIG. 4, observer device 406-2 sends one or more requests to modify playback of the shared playback session to session master 402. In response to receiving the request, the session master determines whether or not to take an action corresponding to the request. In response to determining the action to take, the session master 402 sends a command to each of presentation devices 404-1 and 404-2 (e.g., and any other presentation devices in the shared playback session).

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising,
at a first client device associated with a first user hosting a shared playback session, the first client device being a master device for the shared playback session:
while a first media content item from the shared playback session is being presented on a set of presentation devices, each of the set of presentation devices corresponding to a respective user of a plurality of users in the shared playback session:
communicating with a set of observer devices for the shared playback session, each observer device also corresponding to a respective user of the plurality of users in the shared playback session, wherein a respective device of the set of presentation devices, corresponding to a respective user of the plurality of users, is different from an observer device of the set of observer devices corresponding to the same respective user;
receiving a request to modify playback of the shared playback session from a second client device, the second client device being one observer device of the set of observer devices;
in response to the request to modify playback of the shared playback session, determining an action to take with respect to the shared playback session; and
in response to determining the action to take with respect to the shared playback session, sending a command for the action to each of the set of presentation devices.

2. The method of claim 1, further comprising:
receiving a playback command from a third client device associated with the first user, wherein the third client device is not presenting media content; and
in response to receiving the playback command from the third client device, sending a command corresponding to the playback command to the each of the set of presentation devices.

3. The method of claim 1, wherein:
the second client device is not enabled to execute the requested playback command; and
the command for the action comprises a command for taking no action.

4. The method of claim 1, wherein the first client device is presenting the first media content item concurrently with the set of presentation devices.

5. The method of claim 1, further comprising, sending a second command for a second action to a fourth client device in response to the request to modify playback of the shared playback session, wherein the second command for the second action indicates an action distinct from the command for the action sent to each of the set of presentation devices.

6. The method of claim 1, further comprising, receiving a request for a current status of playback.

7. The method of claim 1, further comprising, receiving a second request to modify playback of the shared playback session from a fourth client device, distinct from the first and second devices, wherein the fourth client device is associated with a third user of the plurality of users in the shared playback session.

8. The method of claim 1, wherein the request to modify playback of the shared playback session comprises a request to add a media content item to the shared playback session.

9. The method of claim 1, wherein the request to modify playback of the shared playback session comprises a request to skip, pause, play, or rewind the first media content item that is currently presented on the set of presentation devices.

10. The method of claim 1, wherein none of the set of observer devices presents the first media content item.

11. A first client device, comprising:
one or more processors; and
memory storing one or more programs executable by the one or more processors, the one or more programs including instructions for:
at the first client device associated with a first user hosting a shared playback session, the first client device being a master device for the shared playback session, while a first media content item from the shared playback session is being presented on a set of presentation devices, each of the set of presentation devices corresponding to a respective user of a plurality of users in the shared playback session:
communicating with a set of observer devices for the shared playback session, each observer device also corresponding to a respective user of the plurality of users in the shared playback session, wherein a respective device of the set of presentation devices, corresponding to a respective user of the plurality of users, is different from an observer device of the set of observer devices corresponding to the same respective user;
receiving a request to modify playback of the shared playback session from a second client device, the second client device being one observer device of the set of observer devices;
in response to the request to modify playback of the shared playback session, determining an action to take with respect to the shared playback session; and
in response to determining the action to take with respect to the shared playback session, sending a command for the action to each of the set of presentation devices.

12. The first client device of claim 11, wherein the one or more programs include instructions for:
receiving a playback command from a third client device associated with the first user, wherein the third client device is not presenting media content; and
in response to receiving the playback command from the third client device, sending a command corresponding to the playback command to the each of the set of presentation devices.

13. The first client device of claim 11, wherein:
the second client device is not enabled to execute the requested playback command; and
the command for the action comprises a command for taking no action.

14. The first client device of claim 11, wherein the first client device is presenting the first media content item concurrently with the set of presentation devices.

15. The first client device of claim 11, wherein the one or more programs include instructions for sending a second command for a second action to a fourth client device in response to the request to modify playback of the shared playback session, wherein the second command for the second action indicates an action distinct from the command for the action sent to each of the set of presentation devices.

16. The first client device of claim 11, wherein the one or more programs include instructions for receiving a request for a current status of playback.

17. The first client device of claim 11, wherein the one or more programs include instructions for receiving a second request to modify playback of the shared playback session from a fourth client device, distinct from the first and second devices, wherein the fourth client device is associated with a third user of the plurality of users in the shared playback session.

18. The first client device of claim 11, wherein the request to modify playback of the shared playback session comprises a request to add a media content item to the shared playback session.

19. The first client device of claim 11, wherein the request to modify playback of the shared playback session comprises a request to skip, pause, play, or rewind the first media content item that is currently presented on the set of presentation devices.

20. A non-transitory computer readable storage medium storing instructions executable by a first client device for:
at the first client device associated with a first user hosting a shared playback session, the first client device being a master device for the shared playback session:
while a first media content item from the shared playback session is being presented on a set of presentation devices, each of the set of presentation devices corresponding to a respective user of a plurality of users in the shared playback session:
communicating with a set of observer devices for the shared playback session, each observer device also corresponding to a respective user of the plurality of users in the shared playback session, wherein a respective device of the set of presentation devices, corresponding to a respective user of the plurality of users, is different from an observer device of the set of observer devices corresponding to the same respective user;
receiving a request to modify playback of the shared playback session from a second client device, the second client device being one observer device of the set of observer devices;
in response to the request to modify playback of the shared playback session, determining an action to take with respect to the shared playback session; and
in response to determining the action to take with respect to the shared playback session, sending a command for the action to each of the set of presentation devices.

* * * * *